US 6,516,616 B2

(12) United States Patent
Carver et al.

(10) Patent No.: US 6,516,616 B2
(45) Date of Patent: Feb. 11, 2003

(54) STORAGE OF ENERGY PRODUCING FLUIDS AND PROCESS THEREOF

(75) Inventors: Calvin R. Carver, Short Hills, NJ (US); Frank T. Bahniuk, Quechee, VT (US)

(73) Assignee: Pomfret Storage Comapny, LLC, Short Hills, NJ (US)

( * ) Notice: Subject to any disclaimer, the term of this patent is extended or adjusted under 35 U.S.C. 154(b) by 0 days.

(21) Appl. No.: 09/804,502

(22) Filed: Mar. 12, 2001

(65) Prior Publication Data

US 2002/0124567 A1 Sep. 12, 2002

(51) Int. Cl.[7] ................................................. F01K 1/00
(52) U.S. Cl. ............................ 60/659; 62/53.1; 62/45.1
(58) Field of Search ............................ 60/659; 62/53.1, 62/50.1, 50.2, 50.3, 50.7, 45.1

(56) References Cited

U.S. PATENT DOCUMENTS

| | | | |
|---|---|---|---|
| 3,724,229 A | * | 4/1973 | Seliber ........................ 62/52 |
| 3,745,770 A | | 7/1973 | Fraser et al. |
| 3,807,181 A | | 4/1974 | Kuhne |
| 3,817,046 A | * | 6/1974 | Aoki et al. .................... 62/40 |
| 3,848,427 A | | 11/1974 | Loofbourow |
| 3,950,958 A | | 4/1976 | Loofbourow |
| 4,037,526 A | | 7/1977 | Jaekle |
| 4,185,456 A | * | 1/1980 | Cummings ................. 60/39.02 |
| 4,224,800 A | | 9/1980 | Grennard |
| 4,513,350 A | | 4/1985 | Coleman |
| 4,523,548 A | | 6/1985 | Engel et al. |
| 4,577,679 A | * | 3/1986 | Hibshman ..................... 165/45 |
| 4,671,700 A | | 6/1987 | Boulanger et al. |
| 4,805,674 A | | 2/1989 | Knowlton |
| 4,858,640 A | | 8/1989 | Kaufmann |
| 5,207,530 A | | 5/1993 | Brooks et al. |
| 5,333,465 A | | 8/1994 | McBride |
| 5,431,482 A | | 7/1995 | Russo |
| 5,461,023 A | | 10/1995 | Chang et al. |
| 5,511,905 A | | 4/1996 | Bishop et al. |
| 5,569,154 A | * | 10/1996 | Navetta ..................... 588/256 |
| 5,613,532 A | | 3/1997 | Kalizewski |
| RE35,639 E | * | 10/1997 | Heyden et al. ............... 374/36 |
| 5,892,148 A | | 4/1999 | Durup et al. |
| 5,957,539 A | | 9/1999 | Durup et al. |
| 5,988,760 A | | 11/1999 | Durup et al. |

* cited by examiner

Primary Examiner—Hoang Nguyen
(74) Attorney, Agent, or Firm—Kenyon & Kenyon (57) ABSTRACT

Large volumes of energy in the forms of gaseous fuels, such as, liquefied natural gas, compressed natural gas, compressed air, or liquid fuels, such as, propane, butane, are stored within an abandoned railroad, highway or aqueduct tunnel or similar such structure, in one or more pressure vessels or cylinders which have been permanently installed within the previously abandoned tunnel structure. The stored energy may be directly delivered at high rates to meet any "peak" demand requirements, or maybe delivered during times of normal demand based on market economics. The stored energy can also be utilized at the site to directly produce electricity for delivery to the end user.

3 Claims, 4 Drawing Sheets

FIGURE 1
(COMPRESSED NATURAL GAS SERVICE)

FIGURE 2
(LIQUEFIED NATURAL GAS SERVICE)

FIGURE 3
(COMPRESSED AIR SERVICE)

FIGURE 4
(LIQUEFIED PROPANE AND/OR BUTANE SERVICE)

STORAGE OF ENERGY PRODUCING FLUIDS AND PROCESS THEREOF

FIELD OF THE INVENTION

The present invention relates to the storage of energy producing fluids for subsequent use, and more particularly, relates to the utilization of a previously used or abandoned railroad, highway or aqueduct tunnel structure as an integral part of a compressed air, compressed or liquefied natural gas, or liquefied propane or butane storage system. It would be used, for example, as a "peaking" service facility, or as a base storage facility for liquefied propane or butane. The invention also provides for the on-site generation of electricity utilizing the energy producing fluids.

BACKGROUND OF THE INVENTION

The need for natural gas for service requirements during peak demand times can occur at several periods during the year. In the summer, for example, natural gas may be used to generate electricity to meet peaking requirements at times of high electric demand. In the winter, natural gas may be used to meet heating and electric requirements when the temperatures are extremely low. Typically the value of natural gas in the winter season is inversely proportional to the temperature below fifteen degrees Fahrenheit. In the summer, the value of natural gas typically becomes most significant when temperatures exceed ninety degrees Fahrenheit.

The best economics for using natural gas storage in peaking cycles traditionally depends on buying the material "off season" and using it in "peak season". The traditional means of storing natural gas is in underground leached salt caverns, in depleted gas fields, and in insulated structures, which are designed to hold liquefied natural gas and are most typically above ground. In a very limited number of situations storage at high pressure has also been done utilizing a multiplicity of relatively smaller volume steel or reinforced plastic cylinders that are buried in the ground. Typically, the use of reinforced plastic cylinders has been in conjunction with compressed natural gas fueling stations. In those cases the volumes involved are significantly smaller than traditional storage volumes. When there is a multiplicity of tanks, the tanks are normally manifolded together to effectively act as a single storage unit. The facilities for all of the above provide for putting the fluid, natural gas, into the storage medium, and for removal of the fluid when required. The rate of removal is traditionally many times the rate of injection. This invention would allow removal of natural gas at very high or low rates dependent upon market conditions.

The traditional underground storage fields for natural gas are often remote from the principal markets to which the gas is delivered, particularly markets in the Northeast. The use of abandoned or inactive railroad, highway or aqueduct tunnels, or similar structures, would be utilized by this invention, and may, in many cases, provide for much closer proximity to the principal markets, reducing time and delivery costs significantly. By its nature, an inactive or abandoned railroad tunnel, particularly when adjacent to a still active railroad line would allow: (1) for economic delivery of not only material required for construction of a storage facility, but also (2) for subsequent delivery into storage of LNG fuel directly by railroad car as contemplated by this invention. The larger volume of a railroad car, as compared to a truck, when utilized for LNG transport may provide a lower economic per unit delivery cost to the facility, thus offering a significant operating cost benefit. The same cost advantage will apply for delivery of liquefied propane or butane by railcars.

When compressed natural gas or compressed air is stored in steel cylinders at high pressure, the cylinders have commonly been buried in trenches in a single layer, and, in a very limited number of cases, in vertical holes drilled for the purpose. The land required to provide a significant volume of stored compressed natural gas (CNG) or air in this manner can thus be extensive.

Large volumes of liquefied propane or butane are typically stored in multiple 30,000 gallon steel tanks located above ground and, when necessary, supported by concrete piers. In a few cases, storage of liquefied propane or butane has been accomplished in mined caverns within impervious rock strata deep under the surface of the ground.

SUMMARY OF THE INVENTION

It is therefore a purpose of the present invention to provide a unique storage system for energy producing fluids, such as, liquefied and compressed gasses.

It is a further purpose of the present invention to utilize an inactive or abandoned railroad, highway or aqueduct tunnel for the storage of large volumes of (a) compressed air, or (b) gaseous fuel in the form of compressed or liquefied natural gas, or (c) liquefied propane or butane.

It is another purpose of the present invention to provide energy producing gases during peak energy demand periods as a source of energy.

It is still another purpose of the present invention to introduce energy producing fluids into storage during off-peak periods.

It is yet another purpose of the present invention to store energy producing gases in compressed or liquid state during off-peak periods with the ability to discharge such gases at high rates during peak periods of demand.

It is still yet another purpose of the present invention to store large volumes of liquefied propane or butane with the ability to discharge such liquefied gases at rates as may be required from time to time.

It is still another purpose of the present invention to perform all of the above referenced energy storage activities and energy deliveries in an environmentally benign method.

The invention in one aspect comprises a structure for storing energy producing fluids, comprising a substantially horizontal opening through the surface of the earth having an opening at each end with at least one storage vessel mounted therein for the storage of an energy producing fluid.

The invention in another aspect comprises a fluid storage facility, comprising: (a) a substantially horizontal tunnel providing ground level access at each end and originally constructed through the surface of the earth for another purpose; and (b) rehabilitating said tunnel to act as a shell for containing the fluid for a storage facility.

The invention in yet another aspect comprises a fluid storage facility, comprising, a substantially horizontal tunnel providing ground level access at each end and originally constructed through the surface of the earth for another purpose, wherein the interior surface of said tunnel is rehabilitated to permit the containment of a fluid storage facility.

The invention in still yet another aspect comprises a fluid storage facility, comprising, a substantially horizontal tunnel providing ground level access at each end and originally constructed through the surface of the earth for another purpose.

The above and other beneficial purposes, advantages and aspects of the present invention are most effectively attained as described in the specifications and in conjunction with the claims.

BRIEF DESCRIPTION OF THE DRAWINGS

The features of the invention believed to be novel and the elements characteristic of the invention are set forth with particularity in the appended claims. The drawings are for illustration purposes only and are not drawn to scale. The numbers represent features in the drawings. The invention itself, however, both as to organization and method of operation, may best be understood by reference to the detailed description that follows taken in conjunction with the accompanying drawings in which:

DETAILED DESCRIPTION OF THE INVENTION

Those skilled in the art will gain an appreciation of the present invention from a reading of the following description when viewed in conjunction with the accompanying drawings of FIGS. 1–4, inclusive. The individual reference characters designate the same or similar elements throughout the several drawings.

This invention provides for the utilization of a substantially horizontal straight opening in the earth with access at ground level at both ends, such as, an inactive or abandoned railroad, highway or aqueduct tunnel, or similar other structure for the storage of large volumes of (a) compressed air, or (b) gaseous fuel in the form of compressed or liquefied natural gas, or (c) liquefied propane or butane. The storage facility of this invention can be an integral part of an associated service system that can provide rapid delivery of: (1) compressed air to a turbine generator; (2) natural gas in times of high demand for delivery to, (a) a natural gas transmission pipeline, (b) a natural gas distribution system, (c) a turbine generator at the site, or (d) an end user such as an industry or electric power generator, which can be located away from the site; and (3) propane or butane, as may be required from time to time.

Figure 1:
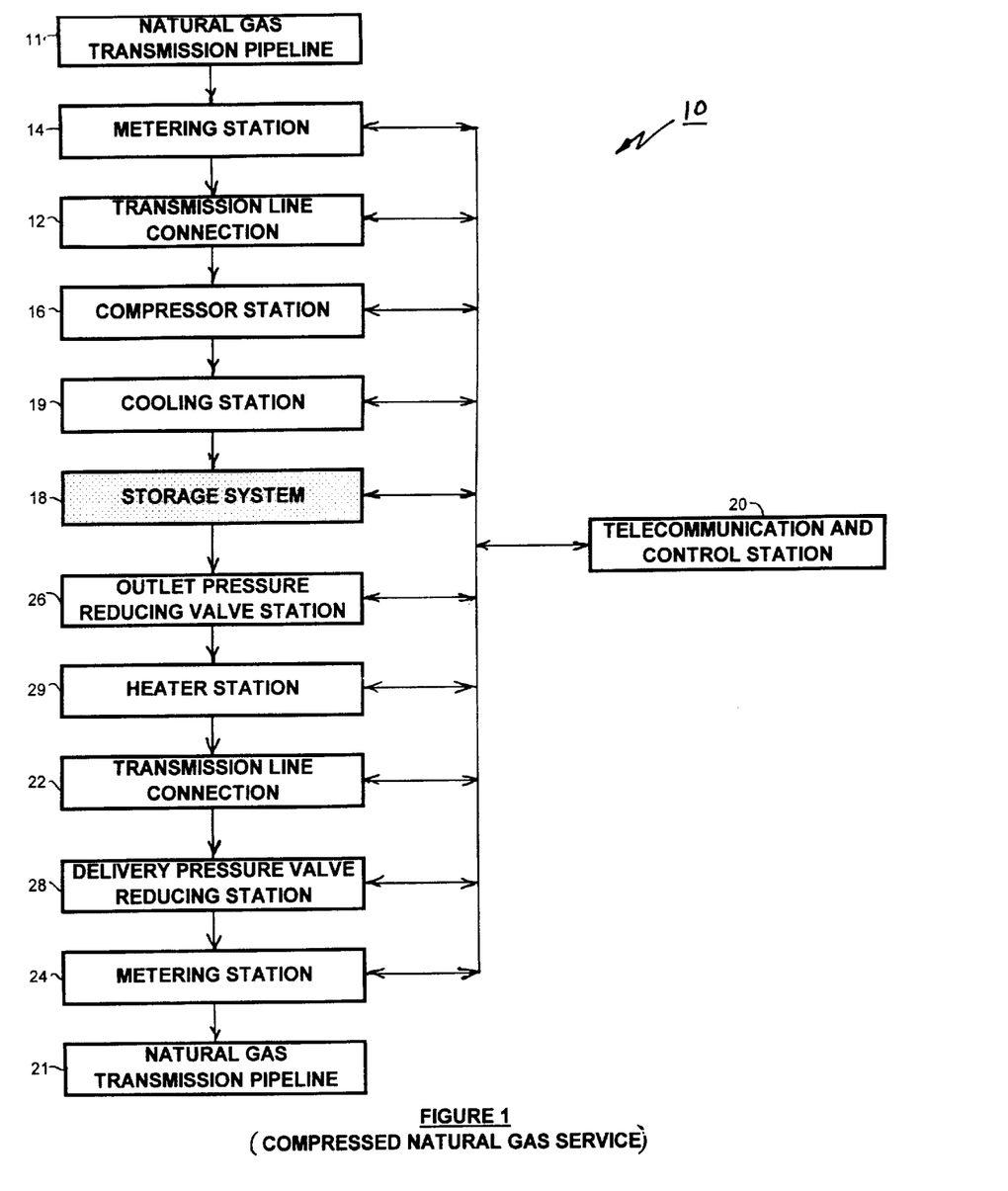
FIG. 1 is a block diagram according to the present invention for the processing and storage of compressed natural gas in either large volume storage container(s) or in a multiplicity of storage containers.

Referring to FIG. 1, there is seen a block diagram, according to the present invention, for the processing and storage of Compressed Natural Gas 10. When the storage service system is designed for Compressed Natural Gas Service 10, the system will provide for a Transmission Line Connection (TLC) 12 that will allow natural gas to be delivered to and from a Natural Gas Transmission Pipeline (NGTP) 11 via a metering station 14. The TLC 12, however, will be designed to operate at a pressure higher than the rated pressure of the NGTP 11 facility to which it is connected. The TLC 12 will deliver gas from the NGTP 11 to the Storage System (SS) 18. The gas going into SS 18 will pass through a Compressor Station (CS) 16 that will compress the gas to the appropriate pressure for the SS 18 and a cooling station 19.

The SS 18 will release natural gas through an Outlet Pressure Reducing Valve Station (OPRVS) 26 having a connection to a turbine generator or to a Delivery Pressure Reducing Valve Station (DPRVS) 28. The OPRVS 26 is used to reduce the pressure to the appropriate pressure required for delivery to the Transmission Line Connection (TLC) 22, or to the "on site" electric generation turbine unit. Such pressure reduction results in a cooling of the gas, and a Heater Station (HS) 29 will warm up the gas to the normal temperature of operation of TLC 22. Moving the gas through the DPRVS 28 and the Metering Station (MS) 24 would allow delivery of the gas to NGTP 21. Natural gas flowing from NGTP 11 to the SS 18 would pass through MS 14, into TLC 12, then into CS 16 and on to cooling station 19. The Cooling Station 19 is located between the CS 16 and the SS 18. The function of the Cooling Station 19 is to reduce the temperature of the compressed gas to an acceptable level for entry into the storage system. The natural gas passing through CS 16 would be compressed to the appropriate pressure for the SS 18. For economy of construction and operation, the design of the SS 18 and its auxiliary components could be done such that a single Metering Station could be designed to fulfill the functions of both MS 14 and MS 24. Similarly, the layout would be such that TLC 12 and TLC 22 could be the same pipeline if the Storage Service System is only connected to a single pipeline. The function of the MS 14 and/or 24 is to measure and record the amount of energy in BTUs, flowing through the station either into or out of the storage system. A Telecommunication and Control Station (TCS) 20 will be utilized to monitor and control the operation of at least the cooling station 19, the heater station 29, the OPRVS 26, the metering stations 14 and 24, and the DPRVS 28. It will be capable of telecommunication of all data for remote operation of the entire storage and service facility. Should delivery be required to a natural gas distribution system, or directly to an end user, an additional stage of pressure reduction in DPRVS 28 would be utilized to reduce the pressure necessary for connection to a distribution main for delivery to a gas distribution system or end user. Natural Gas Transmission Pipelines 11 and 21 could be different facilities or could be one and the same facility.

Should there be a justifiable market for electricity, the output from the OPRVS 26 would be controlled to between 300 or 500 psig, or as required, to fuel a turbine generator. The output of the generator would be connected to an electric transmission facility for sale to third parties. (Not shown.)

Figure 2:
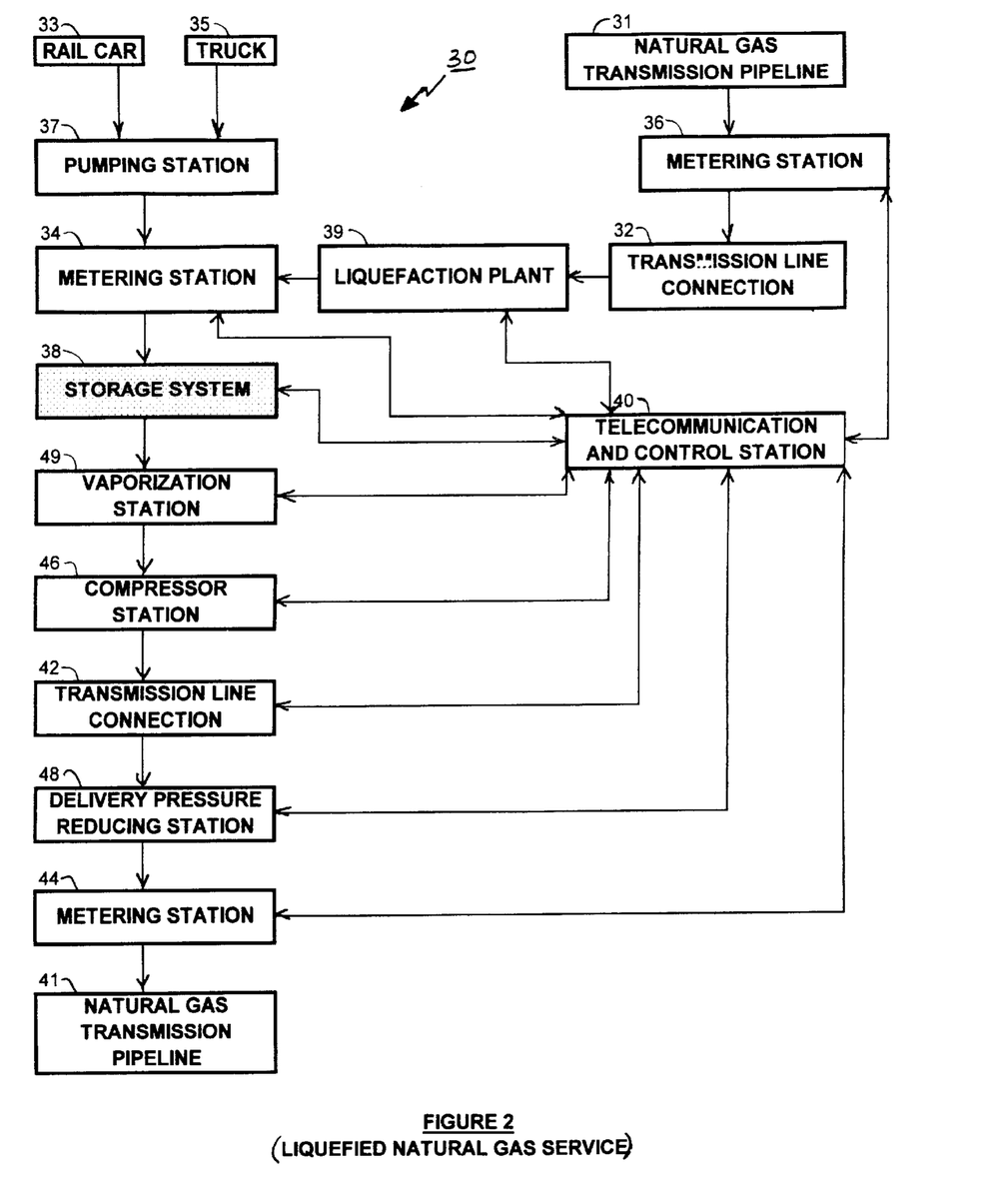
FIG. 2 is a block diagram according to the present invention for the processing and storage of liquefied natural gas.

FIG. 2 is a block diagram, according to the present invention, for the processing and storage of Liquefied Natural Gas (LNG) 30. When the storage service system is designed for LNG, the system will provide for the input to storage for an LNG storage service system which will be in the form of: (a) direct liquid injection (LNG); or (b) natural gas delivered from a natural gas transmission line connection (TLC) and processed though a liquefaction plant to change the state from gas to liquid. The direct liquid injection of LNG would be accomplished by having LNG delivered by rail car 33 to a rail siding where a pipe loading and unloading system would pump the liquid via a pumping station 37 through a metering station 34 and into the insulated storage vessel(s) 38. LNG could also be delivered by LNG delivery trucks 35 to a loading and unloading facility which would pump the liquid via a pumping station 37 into the same Metering Station 34, and into the insulated storage vessel(s) 38. With a feed stock of natural gas the system would start by taking gas from a Natural Gas Transmission Pipeline (NGTP) 31, which gas would flow through Metering Station 34 or 36 and a Transmission Line Connection (TLC) 12 or 32, which has already been described for Compressed Natural Gas 10 (FIG. 1). The TLC 32 would run the gas into the Liquefaction Plant 39. The LNG coming out of the Liquefaction Plant 39 would be connected to the same input line that comes from the rail and truck unloading facilities and into the insulated storage vessel(s) 38.

The output from the system would begin with the withdrawal of LNG from the storage facility. The liquid would be passed though a Vaporization Station 49 that would convert it to natural gas in a gaseous state. The natural gas would be passed through the Compressor Station 46 to raise the pressure to meet pipeline requirements. It would then pass through the TLC 42 for delivery through a pipeline Delivery Pressure Reducing Valve Station (DPRVS) 48 and Metering Station 44 to the NGTP 41. An Outlet Pressure Reducing Valve Station (OPRVS) (not shown) which is connected to a turbine generator (not shown) can also be connected to the DPRVS 48 for the processing of the natural gas. A Telecommunication and Control Station (TCS) 40 will monitor and control the operation of the Liquefaction Plant 39, the Vaporization Station 49, the OPRVS (not shown), the Metering Station 44 and the DPRVS 48. The TCS 40 will be capable of telecommunication of all data and for remote operation of the entire storage and service facility. Should delivery be required to a natural gas distribution system, or directly to an end user, an additional pressure reducing stage to the DPRVS 48 would be utilized to reduce the pressure to the pressure necessary for connection to a distribution main for those deliveries. Similarly for the case of natural gas, Metering Station 36 and Metering Station 44 could be combined into a single unit. Likewise, Transmission Line Connection 32 and Transmission Line Connection 42 could be designed as a single entity if only one NGTP is involved. Natural Gas Transmission Pipelines 31 and 41 could be at different facilities or at the same facility. It should be noted that market economics would determine if and when the service station 30 will include the liquefaction facility 39. Should there be a justifiable market for electricity, the output from the compressor station 46 would be controlled to about 300 or 500 psig, or as required, to fuel a turbine generator (Not shown). The output of the turbine generator would be connected to an electric transmission facility for sale to third parties.

Figure 3:
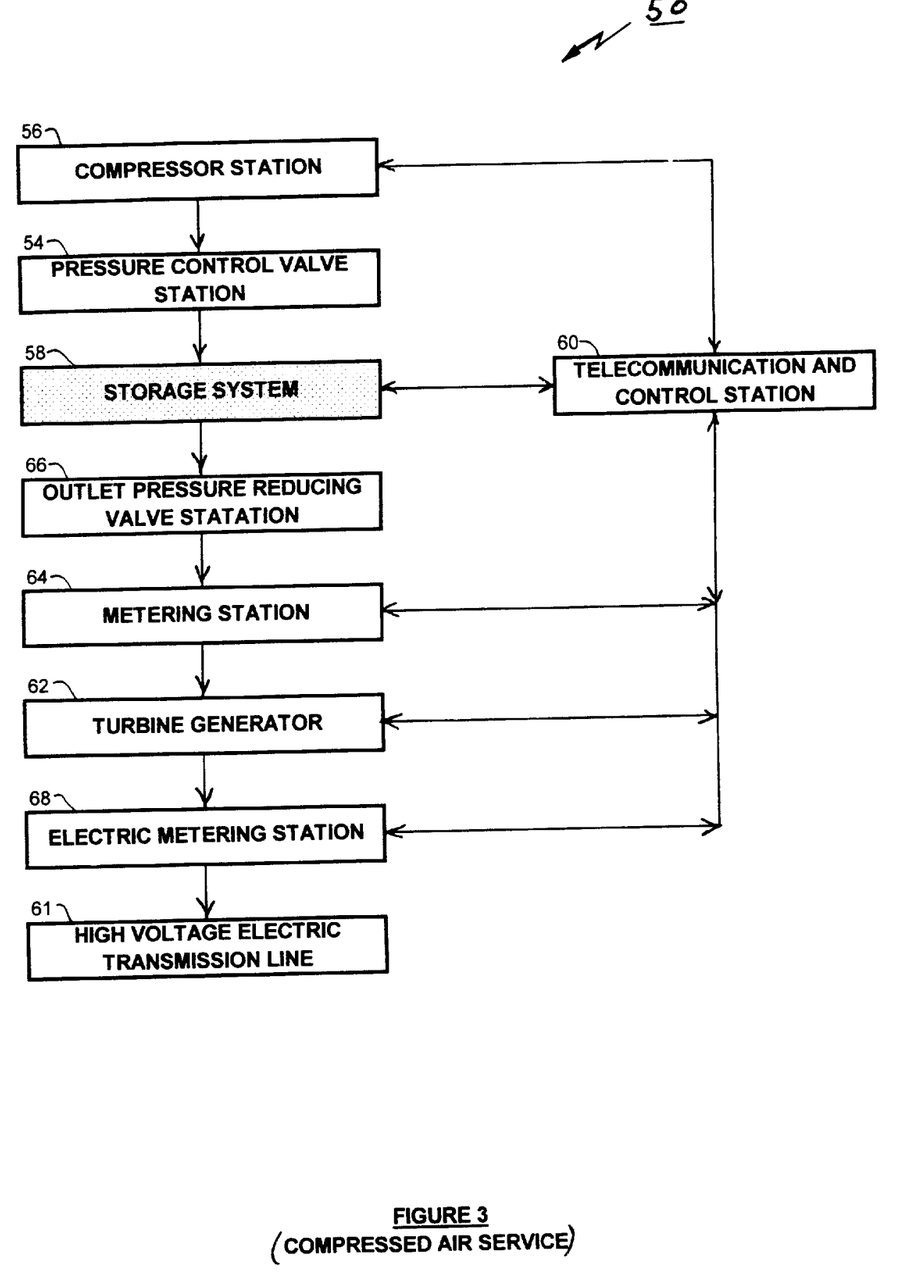
FIG. 3 is a block diagram according to the present invention for the processing and storage of compressed air.

FIG. 3 is a block diagram, according to the present invention, for the processing and storage of Compressed Air 50. When the storage service system is designed for compressed air storage and service, the system will provide for the use of a Compressor Station (CS) 56 with a pressure control valve station (PCVS) 54 to store the compressed air into the storage system 58. The use of compressed air to generate electricity would require that one or more Turbine Generator(s) (TG) 62 are installed at the site. An outlet pressure reducing valve station (OPRVS) 66, with direct connection to the turbine generator 62, would utilize the compressed air to drive the TG 62 after the compressed air has passed through a metering station (MS) 64. The generation of electricity by an air driven turbine generation unit(s) 62 would then lead to transmission of the electricity from the site via high voltage electric transmission lines 61 after being metered in Electric Metering Station 68. Compressed Air would be stored in one or more large volume vessels or in a multiplicity of high-pressure pipes or cylinders in Storage System 58. If more than one pipe or vessel were utilized they would be manifolded together to effectively function as a single storage unit. The rate of removal is traditionally many times the rate of injection. This invention would allow removal of compressed air at very high or low rates dependent upon market conditions. The economics would dictate that the cylinders or pipes would be filled at night or other off-peak times to provide for delivery at high value hourly peaking times that normally occur during the daytime. A Telecommunication and Control Station (TCS) 60 would monitor and control the compressor station 56, the Storage System 58, the Metering Station 64, and the Electric Metering Station 68.

Figure 4:
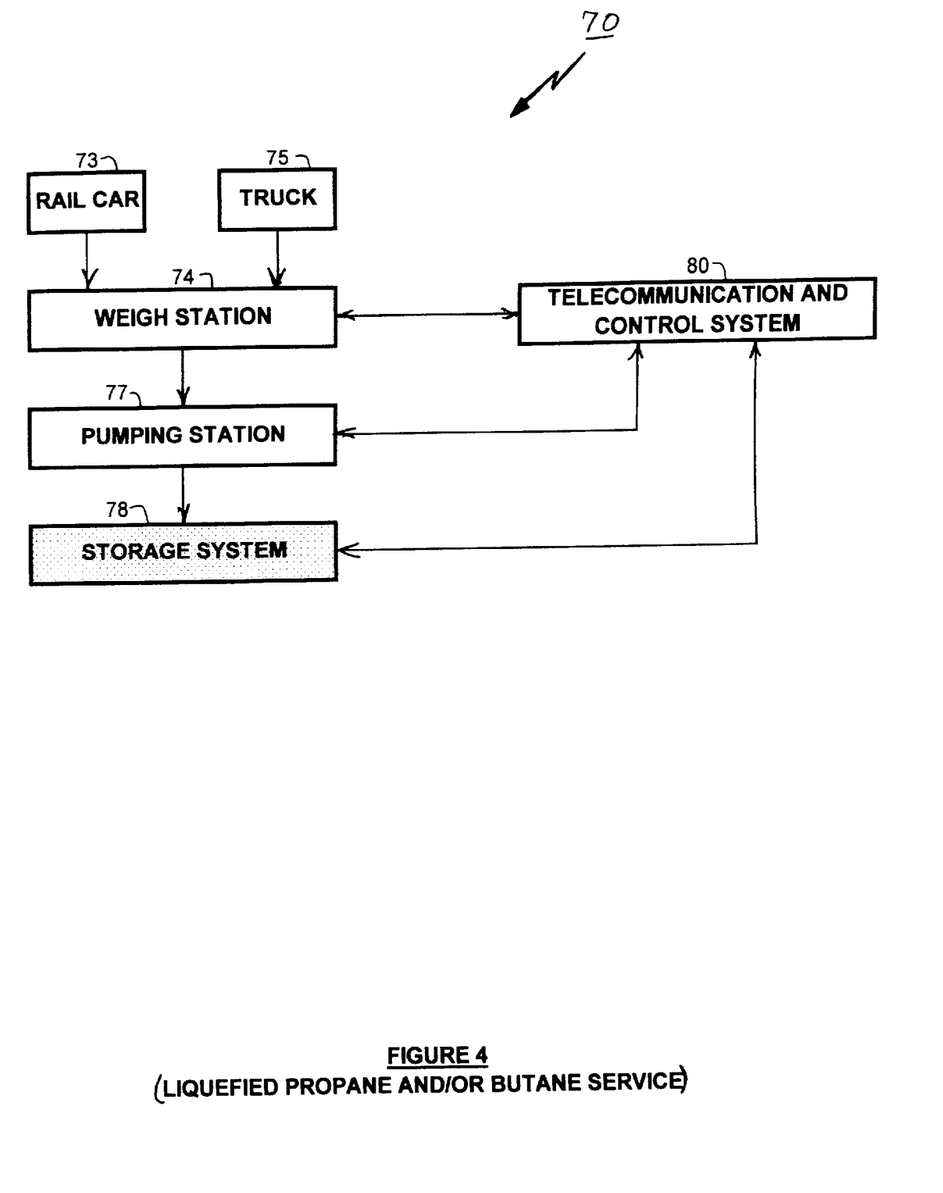
FIG. 4 is a block diagram according to the present invention for the processing and storage of liquefied propane and/or butane.

FIG. 4 is a block diagram, according to the present invention, for the processing and storage of liquefied propane or butane 70. When the storage service system is designed for use of liquefied propane or butane storage 70 and service the system will provide for an inlet piping and control valve system for delivery of liquefied propane or butane from either rail car 73 or truck 75. Delivery vehicles 73 and/or 75 would be weighed at Weigh Station(s) 74 to verify the amount of material (liquid) being received. A Pumping Station 77 is used to help evacuate the liquid from rail cars 73 or trucks 75. This Pumping Station 77 can also be designed for outlet pumping from 15 the storage facility 78. Outlet piping and a control valve system for delivering the propane or butane to a facility utilizing the gaseous fuel at the site, or to trucks 75 or railcars 73 in a liquefied state can also be provided. A Telecommunication and Control Station (TCS) 80 monitors the weigh station 74, a pumping station 77 and the storage facility for liquefied propane or butane 78.

The construction of a Tunnel Storage System would start with the restoration of the abandoned or inactive tunnel structure. The first step in all cases would be to deal with any water intrusion into the tunnel. Grouting with either chemical or other type of grout may deal with any water seepage. If the water intrusion problem is too severe to correct by grouting, then a water drainage system must be built into the floor of the tunnel. Given that the tunnels proposed for use in this invention, would normally be straight both as to alignment and grade, this should be a relatively simple matter. If there is an overall grade to the tunnel, then a gravity water drain can be utilized. If there is no grade then the water drainage system must be constructed utilizing pumping chambers and gravity feeds installed in the floor of the tunnel structure.

In the case of exposed rock faced tunnels, the next step would be the removal of any additional rock face that would be necessary to gain the desired configuration or the additional volume requirement for that particular application. This could be done coincidentally with the elimination of any water intrusion problem as discussed earlier. In the case of concrete faced (lined) or other material faced (lined) tunnels, the material facing would be inspected, and repaired to bring it up to acceptable structural standards. The water removal system would be constructed at this time.

Where large diameter vessels would be utilized for liquefied natural gas (LNG), liquefied propane (LP) or liquefied butane (LB), a non-corrosive electrically insulating material roller or pad system would be installed to facilitate the installation of the vessel(s). In order to allow the large cylindrical or other shaped sections to be uniformly positioned in the structure and easily inserted into the tunnel structure, rollers can be used. The vessel would be built in separate cylindrical or other shaped sections that would be welded together outside of the tunnel structure. The welds would be X-rayed and the sections pushed and/or pulled into the tunnel leaving an end outside for the welding of the next section(s) of the vessel. The piping necessary for the withdrawal of the LNG, LP or LB would be attached to the appropriate vessel section and would be installed in sections along with vessel sections. All of the pipes would be welded and X-rayed at the same time as the vessel sections.

For an LNG system, in addition to the liquid withdrawal line, a gas removal line will be necessary. Even with maximum insulation placed around the tank, there will be some LNG that will continuously convert to a gaseous state. Piping will be necessary to "tap off" and withdraw this converted LNG. This piping will also be installed with the vessel tank sections. After the vessel(s) is in place, the annular space between the vessel and the tunnel structure would be sealed by injection, or it could otherwise be filled with an expanding insulating material that would meet the insulating requirements for LNG storage. The insulation will also be chosen to act as a seal against water intrusion and therefore minimize and possibly, depending upon conditions, eliminate the need for a water removal system.

When the tunnel structure is used for the storage of compressed air or compressed natural gas, a single large storage vessel or a multiplicity of pipes or pressure storage vessels may be utilized. The wall thickness of the vessel(s) will be determined by the vessel(s) configuration and the maximum pressure to be utilized for storage. In the case of a single, or only a few large vessels, additional factors will be considered such as the extent of integration and reinforcement of the vessel(s) by the surrounding rock of the tunnel structure. When a multiplicity of pipes are being used, an aisle would be provided in the center of the structure for access to the pipes and for facilitation of any maintenance work on the piping or the water removal system. A rack structure around the maintenance aisle would be utilized to provide electrical isolation between pipes with pads or rollers to allow installation of the pipes and for non-corrosive supports. The pipes would be welded and x-rayed outside of the tunnel and pushed and/or pulled into the tunnel section by section. It is anticipated that the annular space would be filled with nitrogen or some other inert gaseous material when the construction is complete and the storage service is activated.

With this invention, an inactive or abandoned tunnel, previously used or intended to be used for a highway, a railroad or as an aqueduct, becomes a storage shell and/or a reinforcing integral structural component, for the storage of compressed air or gaseous fuel.

The system provides for storage for compressed air or gaseous fuel. Compressed air would be stored in pipes or pressure vessel(s) at high pressure essentially in the same format used for compressed natural gas. Compressors at the site would compress the air for use in the storage system. The compressed air system would act in a method similar to an electric "pumped storage" system in that the air would be compressed in "out-of-peak" times and delivered to an electric turbine generator at peak electric requirement times. The gaseous fuel would be natural gas that would be stored in the form of natural gas compressed or liquefied, or propane or butane.

The tunnel storage facility will be an integral part of a service system that can provide rapid delivery of large volumes of the stored natural gas fuel in times of high demand to:
a natural gas pipeline;
a natural gas distribution system;
an end user such as an industry, or an electric power facility; or
an electric power turbine generator facility in the immediate vicinity of the storage facility.

The system is also capable of delivering smaller volumes of natural gas fuel requirements in periods of lesser demand when justified by market economics.

A tunnel storage facility can also be constructed as an integral service system for delivery of liquefied propane or butane fuel at such delivery rates as may be required from time to time. Alternatively a tunnel storage facility can also be constructed as an integral service system for compressed air that can provide rapid delivery of compressed air, in periods of high electrical demand, to an electric turbine generator located at the facility.

The storage structure within the tunnel can consist of, or is a combination of, the following:
one or more vessels containing compressed natural gas (CNG) at high pressure, or liquefied propane (LP) or liquefied butane (LB) at normal storage pressure. Depending on the vessel, and the tunnel, a high-pressure storage vessel could be bonded to the tunnel structure;
one or more insulated vessels, containing liquefied natural gas (LNG);
a plurality of steel or reinforced plastic storage cylinders or vessels, using the tunnel structure as a housing to contain the cylinders or containers each storing natural gas or compressed air at high pressure.

The system, depending upon the form of gaseous fuel stored, may include, in addition to the storage structure(s) as outlined above, (a) one or more compressors for compressing natural gas (CNG); (b) a liquefaction plant for converting natural gas to LNG; (c) a vaporizer to convert LNG to natural gas; and (d) one or more pumps to fill or discharge LP or LB from trucks or rail facilities directly into or from the storage structures. The system may also provide pressure regulating valves and high pressure steel piping for direct delivery of natural gas, at elevated pressure directly to a natural gas transmission pipeline, a natural gas distribution system or an end user such as an industry or electric power generator. The system may, alternatively, or in addition to the liquefaction plant (which converts natural gas to liquefied natural gas), also provide for the unloading of LNG from trucks or rail facilities directly into the storage structure. The system provides predetermined volumes of throughput for each storage component utilized, and a predetermined range of delivery rates into and from the system. Immediate direct access from ground level at both ends of the tunnel prior to and during construction and during subsequent operation of the facility will improve the economy of both the construction and operation of the facility. The use of a liquefaction plant at the site is entirely dependent upon the economics of liquefying natural gas into LNG versus filling of the storage facility with LNG delivered by truck or rail facilities.

The invention could also provide for generation of electricity at the site through the use of the stored natural gas or compressed air. The generation of electricity at the site would be entirely market driven. With either the compressed air or the natural gas being easily replaced, the output of the storage service system could be fed directly to a turbine generator unit(s) at the site. The electric output would be fed directly into the electrical transmission grid for sale to third parties.

The use of compressed air to drive an air expansion turbine generator for the generation of electricity draws its economic benefit from the difference in value for electricity between peak and off peak times. The system can utilize either compressed natural gas storage or compressed air storage through independent turbine generators. Both compressed air and gaseous fuel would be utilized in a similar fashion to drive a turbine generator unit(s).

The use for storage, of an abandoned tunnel structure of the type contemplated here, offers several economic advantages:

1. Very large volume storage vessels and/or cylinders can be used. In some cases tunnels of the type contemplated here, up to one mile in length or longer and many feet in diameter may be available for utilization. Thus the volume of storage for liquids or compressed gases can be very significant.
2. The cost of acquiring and maintaining the extensive land areas required to permit storage of a significant volume of air or CNG in single layer storage cylinders or in mined caverns is eliminated. The existing tunnel structure provides the basic cavity required. Storage cylinders can be racked in multiple layers within almost the entire space available.
3. The cost of drilling for installation of the storage vessels, where that approach is utilized, is eliminated as the existing structure already provides the basic cavity required.
4. If single or multiple storage vessels are utilized and are not bonded to the tunnel structure, they would not be buried underground, therefore corrosion protection by cathodic protection systems could be eliminated, thus reducing initial capital costs and subsequent operating expenses. Where the vessel(s) are bonded to the tunnel structure, depending upon the bonding material, cathodic protection could be minimized and/or eliminated. The potential hazard of failure resulting from external corrosive forces would be minimized particularly if nitrogen or some other inert gas were used to fill the voids between the storage vessel(s)and the tunnel structure.
5. The potential for damage to the storage containers by third party excavation such as construction bulldozers and backhoes or utility pole excavations would be eliminated. This is because the storage vessels would be located within a tunnel surrounded by many feet of rock rather than buried underground in locations that could be susceptible to such activity.
6. Tunnels, and particularly railroad tunnels, are normally straight-line facilities allowing for the storage vessels to be of conventional design, with curves being avoided whenever possible. This will benefit installation, maintenance, and removal of the vessels if ever necessary.
7. An inactive or abandoned railroad, highway, or aqueduct tunnel would be at ground level with direct easy access from both ends. This circumstance would result in a more economic construction and reduced cost of operation than would be the case of utilization of a mined cavern that would not have these characteristics.

The economics of compressed air storage used for electric generation peaking depends on compressing the air at "off peak" times with reduced fuel costs and using it in "peak times" for electric requirements. This utilization of the system would be a more specific peaking usage and would be geared towards "hourly demand" requirements for electricity. There can be double digit variances in electricity value on any given day dependent upon the time of day the demand is required. On peak days, this variance is even more significant. This is caused by the fact that it is virtually impossible to store electricity in a commercially viable economical method.

The volume of compressed air or of the gaseous fuel available from the service system will be precisely determined based on the dimensions and maximum allowable pressure of the structural vessel(s) utilized for storage. The service system would be further rated in number of days of availability or designated time periods at full discharge or withdrawal rates. The facilities can be designed to be remotely controlled and operated for the Compressed Air storage and service, the Compressed Natural Gas storage and service and the Liquefied Natural Gas storage and service.

Storage systems for liquefied natural gas (LNG) are traditionally above ground structures while natural gas is traditionally stored in large volumes underground. The incorporation of the tank(s) into the tunnel system would be a most unique storage system for LNG or compressed natural gas, being both above ground and "underground".

The use of the tunnel structure, in particular a railroad tunnel, is particularly advantageous to this application. The tunnel, in nearly all cases, would have been built in a straight line (no curves). Further, the tunnel would only have a straight-line change in grade (no dip). The use of this type of straight-line structure is particularly advantageous from both the installation point of view, and from an economic point of view, for the fabrication and installation of the storage vessels that will be contained in the structure.

A major concern of buried natural gas or other pipelines made of steel is external corrosion of the carrier pipe. Should multiple vessels, cylinders, or pipes be utilized in a tunnel system, they would not be "buried underground", but would be "racked" with electrically insulating pads, with no ground contact. By electrically isolating the pipes, the insulating material, would minimize the requirement for the traditional types for pipe and vessel coatings. Pipe and vessel coatings are usually the largest cost component of cathodic protection of high-pressure steel vessels, cylinders and pipes. This is a major safety and cost advantage. In addition, the void space within the tunnel could be filled with an inert gas, such as nitrogen. This approach further minimizes the possibility of corrosion of the storage vessels and any structural supports employed in the tunnel. Use of an inert gas within the tunnel would further eliminate the possibility of combustion or explosion occurring within the tunnel in the remote chance of a fuel gas leakage from a storage container into the surrounding void spaces.

All above ground natural gas storage tanks, and LNG tanks are at risk for airplane crashes. This is a serious public and regulatory concern. The tunnel system eliminates this risk and concern.

The use of pipes for storage has only been done for relatively small quantities of gas. The storage volumes envisioned for this tunnel storage system would be extremely large and significant. Abandoned and unused tunnels may be found that have substantial length and diameter. Lengths of one mile or more for such structures would not be unusual.

A tunnel structure of the type envisioned is at "ground level" not subterranean. This means that access to this "in-ground" storage system would be at grade. Furthermore, the system would have two means of access, both at grade. The access at grade, and the "flatness and straightness" of these types of tunnel structures, would minimize the cost of pumping to remove ground water. With little or no lifting required, initial costs for pumps and continuing operating costs would be minimized.

The insulating material required for LNG tanks would be more economical due to the containment of the rock surrounding the tunnel. This will occur because the temperature in the tunnel will be relatively constant due to the thickness of the rock structure. The design of the insulation will not have to provide for the differential to the outside surface caused by exposure to direct sun. The normal temperature variance, for example, in the Northeast would be the difference between the heated summer temperature and the ice-covered temperature in the winter. Further, the rock structure, due to the extent of its thickness will provide further insulating value.

The LNG Tanks would be constructed at the site with the cylindrical, "horseshoe" or other shaped sections, which would make sections of the tank, being welded together at the site and slid into the tunnel on rails. The space between the exterior of the tank and the tunnel walls would be filled with insulating material. The insulating material would either be blown into place, or subsequently would be pumped in as a liquid and expanded in place. Direct access from both ends of the tunnel structure would expedite and minimize the cost of the installation of both the tanks and the insulation.

The cylindrical, "horseshoe", or other shaped, sections of the tanks could be both pulled and pushed into place during construction as both ends of a tunnel of the type envisioned are open and accessible.

The installation of multiple pipe or vessel sections for storage vessels would be done most efficiently and economically because of direct access though two ends on grade. Fabrication and installation costs would be minimized due to the "flatness and straightness" of the structure.

When depleted gas fields or leached salt dome caverns or mined caverns are used, there is a need to inject "base gas" which is never recoverable or usable. In natural storage caverns or depleted producing fields there is always a risk of losing the injected gas through a flaw in the rock. The tunnel storage system, because of the use of tanks or pipes, does not have the risk of lost gas. The amount of non-usable base gas is also minimized.

The use of an abandoned or unused railroad, highway or aqueduct tunnel is an enhancement of the environment. This is particularly true when the abandoned facility is open and accessible to the public, particularly since the means of access is directly at grade. The utilization of the abandoned facility eliminates a public hazard, and attractive nuisance. From both a civic and community point of view, it converts a liability into a valuable asset. Elimination of this inherent and significant potential liability currently incurred by the responsible party (if they are a viable and solvent organization) would be beneficial to such owner as well as to the general public in the immediate area.

This invention provides a safe storage system because of the large volume of rock surrounding the actual utilized tunnel portion of the system. Similarly, third party damage from digging is essentially eliminated. A typical abandoned tunnel most probably was constructed many, many years ago, and therefore any potential settlement or other similar adverse geological event would undoubtedly have occurred and would therefore be minimized as a concern. The storage system is also not subject to damage by the weather. For example, all aboveground storage tanks in the Northeast United States are subject to ice damage. Similarly, the aboveground storage tanks have to be designed for snow load, and protected from lighting strikes. Both of these requirements are eliminated in the tunnel system design of this invention. Damage potential from tornadoes or similar high wind weather conditions would also not be a concern with this inventive storage system. Damage from such events is a possibility with conventional above ground storage facilities.

The utilization of an abandoned railroad, highway or aqueduct tunnel as an integral part of an energy storage and service system is unique.

The energy can be stored in the form of a liquid or as a gas. When the energy is in the form of a liquid, for this invention, it would be liquefied natural gas (LNG), liquefied propane (LP) or liquefied butane (LB). Gaseous energy, for this invention, would be compressed natural gas or compressed air.

The storage service facility would be designed primarily to provide energy "peaking" services. This could be rapid high volume delivery of natural gas in the winter to gas distribution systems and end users. LP or LB would be delivered to wholesale suppliers and/or end users for peak seasonal requirements or smaller volumes in periods of lesser demand when justified by market conditions. Natural gas, and compressed air would be delivered, primarily in the summer, for the on site generation of electricity. The storage service system would also be capable of supplying lesser volumes of natural gas, and generation of electricity, during off-peak periods to gas and electric distribution systems when justified by economic conditions and/or distribution system operational requirements.

Very large volume vessels can be utilized as tunnels up to one mile or longer in length and with large diameters may be available for utilization.

The cost of the construction and the installation of the pressure vessel(s) are reduced as the tunnel structure provides an existing cavity within which the storage system is constructed and installed.

Where the storage vessels are integrated with the rock structure of the tunnel, a reduction in material and construction cost is obtained from the benefit of the reinforcement of the vessel by integrating it with the rock surrounding it.

The traditional storage of LNG is in above ground tanks. This invention reduces the hazard of catastrophic third party damage such as from airplane, car or truck crashes, as well as bulldozers and other construction equipment.

Above ground LNG tanks must be designed for exposure to the sun and lighting strikes, and to handle snow and ice loads. Storage vessels located within the tunnel do not have those requirements simplifying design, maintenance and reducing overall costs.

Typically tunnels, such as railroad tunnels, are "straight line" structures without curves and/or dips. This reduces the cost of the fabrication and installation of the storage vessels.

Direct access to the storage facility would be at grade, at both ends of the tunnel. This also reduces construction, installation and operating costs for the facility.

When a multiplicity of vessels is used, they will be isolated from the tunnel structure by electrically insulating material pads minimizing and possible eliminating external corrosion of the vessels.

The reduced exposure to lighting strikes, third party damage, and to corrosion, sun, rain and ice loads, make the tunnel storage design one of the safest energy storage facilities possible.

The additional insulating benefits and the increased safety of the system will result, but will be dependent upon the type of energy being stored, the type of storage vessel(s), and whether the tunnel storage system integrates (bonds) the pressure/storage vessels and the rock structure surrounding the tunnel for structural reinforcement. Where integration is not desirable or necessary, electrical isolation of the pressure vessels from the structure reduces the risk of corrosion. The capital and operating costs of storage of energy make large volumes more attractive. The energy may be directly delivered at high rates to meet "peak" demand requirements, or may be delivered during times of normal demand based on economics. The energy can be utilized at the site to directly produce electricity for delivery. Proximity of the storage site to the ultimate end user or utility distribution system adds economic value to the facility and makes the conversion to electricity more economic. As more gas is delivered from greater distances by costly means and requiring longer delivery times, the need to accumulate gas in storage near markets to meet emergencies, peak and varying demand needs, and to keep the transportation system working at capacity, continues to grow along with total demand. A tunnel storage system minimizes environmental concerns, corrosion problems for the storage vessels, and, compared to above ground storage systems, is a significantly hazard free application when third party damage, weather, natural forces, and airplane hazards are considered. Unlike traditional underground storage facilities, essentially all energy stored is available for delivery. In the tunnel storage system, energy is stored with maximum security and with the greatest availability either in liquid or gaseous states, or for the generation of on site electricity. The tunnel storage system of this invention utilizes a previously abandoned railroad, highway or aqueduct tunnel site that may have been previously a hazardous site or an attractive nuisance. Therefore, the tunnel storage system of this invention will be viewed more positively than any alternative storage system that could be proposed.

While the present invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A fluid storage facility, comprising:
   (a) means for transferring at least one of liquefied propane and butane from a supply source or at least one delivery vehicle to at least one pumping station via at least one weighing station;
   (b) said pumping station transferring said at least one of liquefied propane and butane to at least one storage vessel; and
   (c) wherein said storage vessel is secured within a tunnel that is at least one of a railroad tunnel, a highway tunnel and an aqueduct tunnel, said tunnel passing through the earth, and including an opening at each end of said tunnel, and being configured to contain the at least one storage vessel for the storage of said at least one of liquefied propane and butane.

2. A fluid storage facility for storing at least one of liquefied propane and butane, comprising:
   a tunnel that is at least one of a railroad tunnel, a highway tunnel and an aqueduct tunnel, said tunnel passing through the earth, and including an opening at each end of said tunnel; and
   a fluid storage arrangement, including:
     means for transferring said at least one of liquefied propane and butane from a supply source or at least one delivery vehicle to at least one pumping station via at least one weighing station; and
     said pumping station transferring said at least one of liquefied propane and butane to at least one storage vessel secured within the tunnel.

3. A fluid storage facility, comprising:
   a tunnel that is at least one of a railroad tunnel, a highway tunnel and an aqueduct tunnel, said tunnel passing through the earth, and including an opening at each end of said tunnel; and
   a fluid storage arrangement, including:
     means for transferring at least one of liquefied propane and butane from at least one delivery vehicle to at least one pumping station via at least one weighing station;
     said pumping station transferring said at least one of liquefied propane and butane to at least one storage vessel secured within the tunnel.

* * * * *